United States Patent Office 3,215,586
Patented Nov. 2, 1965

3,215,586
MODIFIED EPOXIDIZED POLYBUTADIENE
RESIN COMPOSITION
Fred Lister, Belle Meade, N.J., and Charles G. Cullen, Yardley, Pa., assignors to FMC Corporation, a corporation of Delaware
No Drawing. Filed Nov. 9, 1960, Ser. No. 68,163
8 Claims. (Cl. 161—203)

This invention relates to new and improved epoxypolybutadiene compositions, to a novel process for effecting the cure of epoxypolybutadienes, and to the cured products thus produced.

It is well known that various polymeric structures containing epoxy groups may be cured, by cross-linking with polyfunctional curing agents, to form polymeric products of very high molecular weight. It is also known that polymers and copolymers of butadiene may be epoxidized, to form products which contain both epoxy groups and some residual unsaturation. The curing of these epoxypolybutadienes, by reacting with polyfunctional curing agents such as polyamines and polycarboxylic acids and anhydrides, has been the subject of much recent investigation. Each of the various types of curing agents which may be used to cure epoxy-containing polymers offers certain advantages and, conversely, each is accompanied by certain disadvantages in particular applications.

There has existed a need for a curing agent for epoxypolybutadienes which not only provides desirable properties in the cured product, but which can be mixed with the epoxypolybutadiene and stored for prolonged periods before curing, without affecting the properties of the cured product. For maximum utility, such a composition of curing agent and resin should not only have a long "shelf life," but should be stable under the conditions normally encountered in formulating, shipping, etc. None of the usual types of curing agents meets these requirements, since not only polycarboxylic acids and anhydrides, but also polyamines, form gels with epoxypolybutadienes in a few days at room temperature.

We have discovered that epoxypolybutadiene compositions containing para-aminobenzoic acid are stable for prolonged periods at ordinary temperatures, yet when cured form cross-linked resins having excellent physical and mechanical properties. This is in marked contrast to the behavior not only of polycarboxylic and polyamine curing agents, but also of the isomeric ortho- and meta-aminobenzoic acids.

Epoxypolybutadienes and para-aminobenzoic acid form, at ordinary temperatures, an intermediate thermoplastic reaction product which is stable for several months at room temperatures, despite the presence of reactive amino groups on the thermoplastic reaction product. This intermediate reaction product is essentially a B-stage epoxypolybutadiene composition, and has a number of particular uses. This composition is readily compounded as a molding powder, and may be stored and shipped after formulation, then molded and cured without further addition of curing agent. Wet and dry lay-ups for laminates can be prepared, and handled or stored for conveniently long periods. The utility of epoxypolybutadiene resins is thus extended to many new areas of application.

Further, we have found that epoxypolybutadiene resins cured with para-aminobenzoic acid are characterized by enhanced physical and mechanical properties, notably high tensile and flexural strengths, as well as unusual versatility in physical properties, such that products ranging from very flexible to rigid cured resins are obtained merely by varying the concentration of para-aminobenzoic acid.

The base resin for the instant composition is a liquid polymer or copolymer of butadiene which has been epoxidized. The polybutadiene itself may be prepared by any of a number of well known methods, such as emulsion or solution polymerization using a wide variety of catalysts, including free radical, alkali metal, Friedel-Crafts and organo-metallic catalysts. Best results are generally obtained with liquid polymers having a molecular weight below about 2500, corresponding to a viscosity below about 50 poises measured at zero shear and 25° C., since higher polymers are very viscous when epoxidized to a high epoxy content and thus not easily worked. When epoxidized to a lower epoxy content higher molecular weight polymers may of course be used, and at epoxy contents as low as 1 or 2%, polybutadienes and copolymers having a molecular weight of 10,000 and higher may be used. The lower limit of the molecular weight range for these polymers is about 100; that is, mixtures of dimers and trimers could actually be used, should they be desired to impart particular properties for special applications. In general, a convenient and preferred molecular weight range for the polybutadienes and copolymers is in the range of about 250 to 5000. Polymers outside of the molecular weight ranges described may also be used, but in the high molecular weight ranges and for solid polymers it is generally necessary to dissolve the polymer in a solvent before carrying out the epoxidation and curing; for certain applications, such as in coatings, this procedure may actually be preferred. Useful techniques for the polymerization and copolymerization of butadiene are described in U.S. Patents 2,631,175 and 2,791,618.

For the epoxidation of the polybutadienes and copolymers thereof, standard epoxidation techniques may be used. Aliphatic, aromatic, and inorganic peracids, salts of the peracids, peroxides and hydroperoxides are the most common of the effective epoxidizing agents.

For convenience, lower aliphatic peracids, such as performic, peracetic, perpropionic and perbutyric are preferred reagents. With these reagents, the epoxidation reaction may be carried out using a preformed peracid, or the peracid may be formed in the reaction medium, generally by adding hydrogen peroxide to an aliphatic acid or anhydride medium. Peracids may be prepared in any known way, such as is described in "Organic Syntheses," coll. volume I, second edition, John Wiley and Sons (1941), page 431. A number of epoxidation techniques for polybutadiene are illustrated in U.S. Patent 2,826,556 to F. P. Greenspan and A. E. Pepe.

The epoxidation may be conducted using stoichiometric amounts of the peracid: that is, one mole of hydrogen peroxide or peracid per double bond in the polymer; or amounts below that theoretically required may be used. There is no significant advantage to using excess oxidant and, although the reactivity and properties of the epoxidized polybutadienes do vary with the degree of oxidation, it has been found that the use of as little as 5% of the theoretical amount of peracid will produce useful resins. In general, the epoxidized polybutadienes used herein contain at least 1% by weight of epoxy oxygen, and it is preferred for most applications to employ epoxypolybutadienes having about 4 to 10% epoxy oxygen by weight. Epoxypolybutadienes containing more than 10% epoxy oxygen tend to be extremely viscous, especially in the higher molecular weight range; but this may actually be desired for special applications, such as coatings. As stated above, the viscosity of epoxypolybutadiene is increased by increasing the molecular weight of the base polymer or copolymer; and of course the viscosity of a particular epoxy resin may be lowered by the appropriate use of solvents, suitable solvents including such common organics as heptane, benzene and chloroform.

The amount of para-aminobenzoic acid used varies with the degree of epoxidation of the epoxypolybutadiene, as well as with the properties desired in the final product. In general, one epoxide equivalent of epoxypolybutadiene, that is, the amount of epoxypolybutadiene containing one atom of epoxy oxygen, reacts with one equivalent of para-aminobenzoic acid. When less than this amount of para-aminobenzoic acid is present, the product becomes extremely flexible, although otherwise cured. In general, useful results are obtained in the range of about 0.25 to about 1 equivalent of para-aminobenzoic acid per epoxide equivalent. When the amount of para-aminobenzoic acid approaches the lower limit of 0.25 equivalent, the flexible products which result have special applications, such as in castings requiring high resistance to thermal shock, as in the encapsulating and potting of electrical components. There is no significant advantage to the use of more than stoichiometric amounts of para-aminobenzoic acid. But in general, about equivalent amounts of curing agent and resin are preferred, for maximum flexural and tensile strengths.

In the usual practice of this invention, the para-aminobenzoic acid and the epoxypolybutadiene are mixed at relatively low temperatures. Of course, room temperature operation is most convenient, at which temperature the mixture is stable for several months. Lower temperatures may of course be used, and it is preferred for most purposes to maintain the composition in the intermediate thermoplastic stage at temperatures below about 60° C. At higher temperatures the life of the intermediate composition is shortened; although it may be exposed to temperatures of about 80° C. or higher for short periods, for example, without causing gelation of the intermediate composition. Very low temperatures, such as 0° C. or lower, do not adversely affect the composition.

At these relatively low temperatures the carboxyl group of the para-aminobenzoic acid reacts with the epoxypolybutidiene, the rate of reaction depending of course on the reaction temperature. This mixture is thermoplastic and is stable for prolonged periods at ordinary temperatures.

In the intermediate form, the para-aminobenzoic acid-epoxypolybutadiene composition may be formulated with fillers dissolved in suitable solvents such as low molecular weight ketones, ethers, aromatic hydrocarbons, etc., and used to prepare castings, molding powders and laminates, applied as a coating, and used in many other resin applications.

The cure of the resin is completed at elevated temperatures, to form a cross-linked thermoset product. The completion of the cure is accomplished by cross-linking the resin through the para-amino group. This is accomplished at a practical rate at temperatures between about 80°–200° C. Lower temperatures may be used for longer periods, although at temperatures below about 75° C. cure is not obtained within a reasonable time in the absence of a catalyst. At temperatures above 200° C. care must be used to avoid charring. Very rapid cure is obtained at these high temperatures. Many variations in curing procedure are possible. If desired, catalysts for the amine cure may be present, typically phenols such as resorcinol, bis(4-hydroxyphenyl)dimethylmethane, phenol, and the like. These catalysts may be incorporated into the initial reaction mix, in amounts up to about 10% by weight of the epoxypolybutadiene, and do not significantly affect the stability of the resin in the intermediate state.

The products of this invention may be combined with glass fibers or other reinforcing agents, with plasticizers, flexibilizers, fillers, extenders, pigments and dyes, and many other materials, for specific applications.

The practice of this invention is specifically illustrated in the following examples. Mechanical properties of the specific products described in the examples were determined according to standard ASTM tests. All parts are by weight unless otherwise indicated.

Example 1

Butadiene was polymerized as follows: About 4.3 parts of sodium as a 46% dispersion in kerosene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383, melt viscosity of 16.4 poises at 25° C. extrapolated to zero shear, and molecular weight of 980. This polybutadiene was epoxidized as follows: About 100 parts of liquid polybutadiene, 100 parts of benzene, 31.6 parts of Dowex resin 50 X–12 (a sulfonated styrene-divinylbenzene polymer cross-linked with 12% divinylbenzene) and 16.2 parts of glacial acetic acid were heated with agitation to 60° C. About 70 parts of 50% hydrogen peroxide was then added, over a period of 3 hours. The temperature was maintained at 60° C. for an additional 4 hours, the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene at 35° C. and 60 mm. Hg. The epoxypolybutadiene obtained as residue had an epoxy oxygen content of 8.93% and a melt viscosity of 1665 poises extrapolated to zero shear at 25° C.

To 100 parts of this epoxypolybutadiene was added 12 parts of para-aminobenzoic acid and 3 parts resorcinol. The materials were mixed thoroughly on a three-roll mill. After standing at 50° C. for 2 weeks the homogeneous solution was deaerated at 50–60° C., poured into a sheet mold, and cured for 2 hours at 80° C. and 24 hours at 155° C. The product was a rigid clear resin, having the following properties: flexural strength 11,200 p.s.i., flexural modulus 327,000 p.s.i., flexural elongation 5.0%, tensile strength 6,300 p.s.i., tensile modulus 637,000 p.s.i. and tensile elongation 1.0%.

Example 2

The polybutadiene prepared in Example 1 above was epoxidized as follows: About 100 parts of this polybutadiene, 100 parts of toluene, 41.6 parts of Dowex resin 50 X–8 (a sulfonated styrene-divinylbenzene polymer cross-linked with 8% divinylbenzene) and 16.2 parts of glacial acetic acid were charged to an agitated reaction flask, and heated to 60° C. About 30 parts of 50% hydrogen peroxide was added to the mixture over a period of 1.5 hours, at 60–70° C. Heating at 60–70° C. was continued for an additional 1.5 hours. The mixture was then cooled to 25° C., filtered through fiber glass, and neutralized with about 25 parts of sodium carbonate. The oily layer was separated, and water was removed by azeotropic distillation with 125 parts of benzene, followed by removal of volatiles at 35° C. and 60 mm. Hg. The epoxypolybutadiene residue had an epoxy oxygen content of 6.2% and a melt viscosity of 147 poises at 25° C. extrapolated to zero shear.

To 100 parts of this epoxypolybutadiene was added 12 parts of para-aminobenzoic acid and 2 parts resorcinol. The materials were mixed thoroughly on a three-roll mill. The mixture was deaerated at 50–60° C., poured into a sheet mold, and cured for 2 hours at 80° C. and 24 hours at 155° C. The product was a rigid clear resin, having the following properties: tensile strength 1,100 p.s.i., tensile modulus 9,800 p.s.i., tensile elongation 35.0% and Shore A hardness 83.0.

*Example 3*

To 100 parts of the epoxypolybutadiene described in Example 1 was added 12 parts of para-aminobenzoic acid, and the materials were mixed thoroughly on a three-roll mill. After standing for two months at room temperature the mixture was deaerated while warming to 50–60° C., poured into a sheet mold, and cured for 2 hours at 80° C. and 24 hours at 155° C. The product was a very flexible clear resin, having a tensile strength of 1,200 p.s.i., tensile modulus of 10,300 p.s.i. and tensile elongation of 64.0%. These results were at least as good as those obtained from a sample which had been cured after standing for only one half hour.

*Example 4*

With 100 parts of the epoxypolybutadiene described in Example 1 was blended 24 parts of para-aminobenzoic acid and 2 parts resorcinol, to produce a solution which after three months was still soluble and fusible. Curing in a sheet mold for 2 hours at 80° C. and 24 hours at 155° C. produced a clear product having a flexural strength of 15,600 p.s.i., flexural modulus of 3,770,000, flexural elongation of 7.1%, tensile strength of 9,400 p.s.i., tensile modulus of 7,850,000 and tensile elongation of 3.0%.

Repeating the above procedure, replacing the para-aminobenzoic acid with meta-aminobenzoic acid, produced a solution which gelled within 1 week at room temperature.

*Example 5*

With 100 parts of the epoxypolybutadiene described in Example 1 was blended 35 parts of para-aminobenzoic acid, 15 parts of bis(4-hydroxyphenyl)dimethylmethane and 150 parts of methyl isobutyl ketone. The resulting mixture was used to coat No. 181 fiberglass cloth having a methacrylato-chrome complex finish, commonly known as Volan-A. The solvent was evaporated at ambient temperature, and the coated cloth was stored for four weeks at room temperature. A 12-ply layup of the cloth was prepared, and cured at 155° C. for 5.5 hours at 100 p.s.i. molding pressure. The resulting laminate had a flexural strength of 81,200 p.s.i., flexural modulus of 3,960,000 p.s.i. and flexural elongation of 2.3%.

*Exmaple 6*

With 100 parts of the epoxypolybutadiene described in Example 1 was blended 32 parts of para-aminobenzoic acid and 80 parts of methyl isobutyl ketone. To this blend was added 140 parts of calcium carbonate, 32 parts asbestos fibers, 1 part carnauba wax as mold release agent and 0.4 part of PV-Fast Red B. pigment. This molding powder formulation was blended by stirring, the solvent was evaporated under reduced pressure, and the mixture was allowed to stand for one month. The molding powder was then compression molded in bars 5″ x ½″ x ¼″ for 10 minutes at 150° C. and 80–100 p.s.i. The product had a Barcol hardness of 80–85, Rockwell (M) hardness of 81, and Rockwell modulus of 950,000 p.s.i.

It is apparent that this invention is susceptible to numerous modifications within the scope of the disclosure, and it is intended to include such variations within the scope of the following claims.

What is claimed is:

1. The method of curing an epoxypolybutadiene resin containing at least about 1% by weight of epoxy oxygen, which comprises admixing said epoxypolybutadiene with about 0.25 to 1 equivalent per epoxy oxygen of para-aminobenzoic acid, allowing said epoxypolybutadiene to react with the carboxyl group of said para-aminobenzoic acid at temperatures below the reaction temperature of the amino group of said para-aminobenzoic acid thereby forming a relatively stable, thermoplastic intermediate, and completely curing said epoxy-polybutadiene at temperatures above the reaction temperature of said amino group.

2. The method of curing an epoxypolybutadiene resin containing 4–10% by weight of epoxy oxygen, which comprises admixing said epoxypolybutadiene with about 0.25 to 1 equivalent per epoxy oxygen of para-aminobenzoic acid, allowing said epoxypolybutadiene to react with the carboxyl group of said para-aminobenzoic acid at temperatures below the reaction temperature of the amino group of said para-aminobenzoic acid thereby forming a relatively stable, thermoplastic intermediate, and completely curing said epoxypolybutadiene at temperatures above the reaction temperature of said amino group.

3. The method of curing an epoxypolybutadiene resin containing 4–10% by weight of epoxy oxygen, which comprises admixing said epoxypolybutadiene with about 0.25 to 1 equivalent per epoxy oxygen of para-aminobenzoic acid, allowing said epoxypolybutadiene to react with the carboxyl group of said para-aminobenzoic acid at a temperature below about 80° C. thereby forming a relatively stable, thermoplastic intermediate, and completely curing said epoxypolybutadiene at a temperature in the range of 80–200° C., in the presence of a phenolic catalyst.

4. The relatively stable, thermoplastic resin composition which comprises the intermediate reaction product of an epoxidized polybutadiene containing at least about 1% by weight of epoxy oxygen and para-aminobenzoic acid, wherein the carboxyl group of said para-aminobenzoic acid has substantially reacted with said epoxypolybutadiene and the amino group of the para-aminobenzoic acid is substantially unreacted.

5. The relatively stable, thermoplastic resin composition which comprises the intermediate reaction product of an epoxypolybutadiene resin containing 4–10% by weight of epoxy oxygen and 0.25 to 1 equivalent per epoxy oxygen of para-aminobenzoic acid, wherein the carboxyl group of said para-aminobenzoic acid has substantially reacted with said epoxypolybutadiene and the amino group of the para-aminobenzoic acid is substantially unreacted.

6. The relatively stable, thermoplastic resin composition which comprises the intermediate reaction product of an epoxypolybutadiene resin containing 4–10% by weight of epoxy oxygen and 0.25 to 1 equivalent per epoxy oxygen of para-aminobenzoic acid, wherein the carboxyl group of said para-aminobenzoic acid has substantially reacted with said epoxypolybutadiene and the amino group of the para-aminobenzoic acid is substantially unreacted, and a phenolic catalyst.

7. Laminated structure comprising laminae coated and impregnated with a relatively stable, thermoplastic composition comprising the reaction product of an epoxidized polybutadiene containing at least about 1% by weight of epoxy oxygen and para-aminobenzoic acid.

8. The method of preparing a metastable thermoplastic laminated structure capable of further cure which comprises coating and impregnating laminae with a composition comprising an epoxidized polybutadiene containing at least 1% by weight of epoxy oxygen and about 0.25 to 1 equivalent per epoxy oxygen of para-aminobenzoic acid.

References Cited by the Examiner

UNITED STATES PATENTS

| | | | |
|---|---|---|---|
| 2,826,556 | 3/58 | Greenspan et al. | 260—2 |
| 2,829,135 | 4/58 | Greenspan et al. | 260—2 |
| 2,988,535 | 6/61 | Feuchtbaum et al. | 260—2 |

LEON J. BERCOVITZ, *Primary Examiner.*

HAROLD N. BURSTEIN, *Examiner.*